United States Patent [19]

Maehara

[11] 4,294,335

[45] Oct. 13, 1981

[54] DEVICE FOR AUTOMATICALLY ADJUSTING A BRAKING CLEARANCE FOR A DISC BRAKE

[75] Inventor: Toshifumi Maehara, Chichibu, Japan

[73] Assignee: Akebono Brake Industry Co., Ltd., Japan

[21] Appl. No.: 82,292

[22] Filed: Oct. 5, 1979

[30] Foreign Application Priority Data

Oct. 13, 1978 [JP] Japan .................. 53-139606[U]

[51] Int. Cl.³ ............................................ F16D 65/56
[52] U.S. Cl. ............................. 188/71.9; 188/196 BA
[58] Field of Search ............ 188/71.9, 196 D, 196 BA

[56] References Cited

U.S. PATENT DOCUMENTS 3,550,732  12/1970  Beller ........................... 188/196 D
3,774,733  11/1973  Farr ............................. 188/196 D Primary Examiner—Duane A. Reger
Attorney, Agent, or Firm—John E. Toupal

[57] ABSTRACT

A device for automatically adjusting a braking clearance for a disc brake in which at least one friction pad is directly placed in frictional engagement with a disc rotor by means of a piston. The device comprises an adjusting bolt, stop means for controlling movement of the adjusting bolt, an adjusting nut threaded on the adjusting bolt, first spring means retained between a main piston and the adjusting nut, a stepped piston slidably mounted within the main piston, frictional surfaces opposedly disposed on the stepped piston and the adjusting nut, and second spring means for biasing the stepped piston. When pressure within the liquid chamber of the cylinder reaches a predetermined level, the stepped piston is moved against the force of the second spring means so that both frictional surfaces are engaged to impede rotation of the adjusting nut.

6 Claims, 4 Drawing Figures

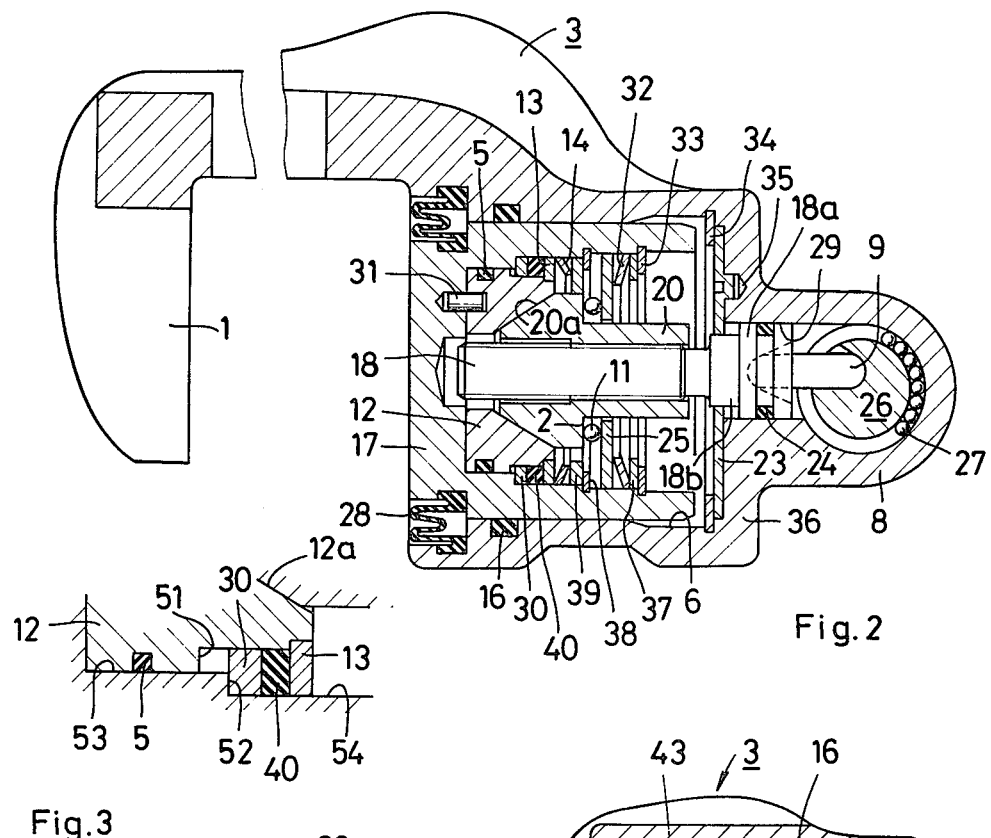
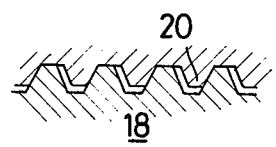
Fig. 3
Fig. 4
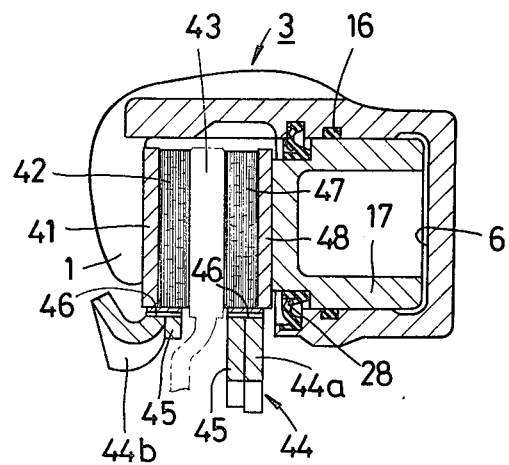
Fig. 1

4,294,335

DEVICE FOR AUTOMATICALLY ADJUSTING A BRAKING CLEARANCE FOR A DISC BRAKE

BACKGROUND OF THE INVENTION

The present invention relates to a device for automatically adjusting a braking clearance for a disc brake of the type in which at least one friction pad is directly placed in frictional engagement with a disc rotor by means of a hydraulically-operated piston.

With disc brakes of the type above described, the deformation of a friction pad resulting from compression thereof or the deformation of a reaction portion of a caliper used with friction pads that straddle the disc rotor can produce an undesirable change in braking clearance. As a result of such an occurrence, a friction pad can remain engaged with the disc rotor even after brake release, thus giving rise to dragging. Attempts to eliminate these problems have resulted in various types of adjustment devices. For example, with one-shot adjusting mechanisms that provide a desired braking clearance with a single adjustment, the caliper and friction pads are provided with a rigidity high enough so as to undergo minimum deformation. However, such a system has the disadvantage of excessive weight resulting from the increased rigidity and strength of the caliper. Another proposal is a micro-adjusting mechanism in which the maximum adjustment of braking clearance obtained by a single braking operation is much smaller than the amount of friction pad wear that occurs in response thereto. In this mechanism, however, if a large braking clearance exists when the adjusting device is initially installed, it is necessary to repeat the braking operation many times in order to obtain the desired braking clearance. Also, the mechanism is more complicated.

The object of the present invention is to overcome the limitations noted above by providing a brake adjusting device that eliminates requirements for excessive adjusting action without an excessive increase in weight.

SUMMARY OF THE INVENTION

The present invention is a device for automatically adjusting a braking clearance for a disc brake of the type in which a friction pad is placed in engagement with a disc rotor by means of a hydraulically operated main piston displaced in a direction perpendicular to the surface of the disc rotor. Included in the device is an adjusting bolt reciprocally supported by an end wall of a cylinder in which the main piston is fitted, the adjusting bolt having a foremost end extended into a liquid chamber of the cylinder; a means preventing rotation of the adjusting bolt; an adjusting nut threaded on said adjusting bolt, the adjusting nut having a shoulder coupled to the main piston by a thrust bearing; a stepped piston with an increased diameter portion reciprocally fitted in an inner periphery of the main piston; a limit member preventing rotation of the stepped piston; a friction clutch defined by conical surfaces on the stepped piston and the adjusting nut; and an excessive adjustment preventive spring for biasing the stepped piston in a direction releasing engagement of said friction clutch mechanism and whereby a fluid pressure in said cylinder exceeding a predetermined value causes the stepped piston to withdraw from the main piston against said excessive adjustment preventive spring and to come into frictional engagement with the adjusting nut.

According to other features of the invention, the adjusting bolt is slidably supported on the end wall of the cylinder of a caliper and the adjusting nut is screwed on the adjusting bolt which is coupled by a spring and a thrust bearing to the main piston so as to be biased by displacement thereof in a brake actuating direction. The stepped piston is fitted between the adjusting nut and an inner wall of the main piston toward which it is urged by the excessive adjustment preventive spring. With this arrangement, when the adjusting bolt is retained by fluid pressure in the main cylinder and the adjusting nut is delayed relative to displacement of the brake piston, the clutch mechanism is released and the adjusting nut threadably moves on the bolt to achieve a desired braking clearance adjusting action. When fluid pressure within the cylinder reaches an excessively large value, the stepped piston withdraws from the brake piston to engage again the clutch and eliminate the braking clearance adjusting action. In this manner, the automatic adjusting device is prevented from inducing excessive adjustment.

BRIEF DESCRIPTION OF THE DRAWINGS

The many objects and advantages of a device for automatically adjusting a braking clearance for a disc brake in accordance with the present invention will become apparent upon consideration of the following detailed description and the accompanying drawings in which:

FIG. 1 is a longitudinal sectional view of a general disc brake on which is mounted a device for automatically adjusting a braking clearance in accordance with the present invention;

FIG. 2 is a longitudinal sectional view of the device for automatically adjusting a braking clearance in accordance with the present invention;

FIG. 3 is a view in an enlarged scale showing a featured portion of the device; and FIG. 4 is a longitudinal sectional view showing in detail a featured relationship between an adjusting nut and an adjusting bolt shown in FIG. 2.

DESCRIPTION OF THE PREFERRED EMBODIMENTS

Illustrated in FIG. 1 is a general disc brake to which the present invention is applied. The arrangement comprises a flat plate support member 44 which straddles an outer periphery of a disc rotor 43 and is bent into an inverted U-shape. A pair of friction pads 42, 47 are slidably carried in recesses 46 of walls 44a, 44b, respectively, obtained by cutting upper peripheral edges of the support member 44 into the U-shape as viewed from the side. Also included in the brake is a caliper 3 slidably supported on the support member 44, a cylinder 6 formed integral with the caliper 3 and a piston 17 fitted into the cylinder 6 with a seal ring 16. The piston 17 has an end abutting a back plate 48 of the friction pad 47 and the caliper 3 straddles the outer periphery of the disc rotor 43. Suspended along the opposite side of the disc rotor 43 is a reaction portion 1 placed in abutment with a back plate 41 of the friction pad 42. It will be noted that the walls 44a, 44b of the support member 44 are parallel with the disc rotor 43 and are reinforced by plates 45, respectively. A dust-proof boot 28 is mounted between the outer end of the piston 17 and the caliper 3.

In accordance with the present invention, as shown in FIG. 2, the caliper 3 has an end wall 36 formed with a bore 29 in which is supported a head 18a of an adjusting bolt 18 with a seal ring 24. The adjusting bolt 18 has a square sectional portion 18b, which engages a similarly square central opening of a plate 23. The plate 23 is positioned in a recess 35 of the end wall 36 and is fixed by a snap ring 34 fastened to the interior of the cylinder 6. Thus, the adjusting bolt 18 can move axially but cannot rotate. A projected wall portion 8 extends from the end wall 36 of the cylinder 6 and carries a cam shaft 26 through a bearing 27. A cam follower rod 9 is interposed between a groove formed in the peripheral surface of the cam shaft 26 and a groove formed in the end surface of the head 18a of the adjusting bolt 18. The end of the adjusting bolt 18 extends into the cylinder 6 and an adjusting nut 20 is threaded thereon through helical grooves of a large lead (FIG. 4). Formed on one end of the adjusting nut 20 is a conical surface 20a while an opposite shoulder portion 2 is engaged by an annular plate 25 through a thrust bearing 11. A force is applied through the thrust bearing 11 to the plate 25 by a Belleville spring 32 retained by an annular plate 37. Retaining the plate 37 is a snap ring 33 fastened in a groove of a cylindrical portion 54 of the piston 17.

As shown in FIG. 3, an annular stepped piston 12 is fitted into a cylindrical bore 53 of the piston 17 and is sealed thereto by a seal ring 5. The stepped piston 12 defines a tapered annular surface 12a that engages with the conical surface 20a of the adjusting nut 20 to form a clutch mechanism. Engaging both an end wall of the piston 17 and the stepped piston 12 so as to prevent rotation thereof is an axial pin 31 disposed eccentrically with respect to the center axis of the piston 17. A shoulder 51 is formed by a reduced diameter portion at one end of the stepped piston 12. That reduced diameter portion and a counterbore 54 in the piston 17 form an annular space that accommodates a backup ring 30 and a seal ring 40. The backup ring 30 is in engagement with a shoulder portion 52 of the bore 54. Retaining the seal ring 40 is a ring 13 that engages a shoulder formed at the right end of the stepped piston 12. As shown in FIG. 2, a ring 39 is retained by means of a snap ring 38 fastened to the cylindrical counterbore 54, and the stepped piston 12 is forced against a closed end wall of the main piston 17 by a Belleville spring 14 positioned between the ring 39 and the ring 13. It is to be noted that the piston 17 is connected with the friction pad 47 and is prevented from rotation within the cylinder 6 by means of a frictional force applied by the seal ring 16.

OPERATION

Next, the operation of the above-described device will be described. When fluid pressure is admitted to the cylinder 6 in response to brake actuation, the piston 17 is displaced leftwardly to eliminate any gap between the disc rotor 43 and the friction pad 47. At this time, motion of the piston 17 is transmitted to the adjusting nut 20 through the Belleville spring 32, the ring 25, and the thrust bearing 11. When as shown in FIG. 4, the amount of this displacement exceeds the backlash between the adjusting nut 20 and the adjusting bolt 18, the nut 20 pulls the adjusting bolt 18 in the same direction. Thus, if the force established by the fluid pressure $P_1$ within the cylinder 6 on the sectional area $A_1$ of the head 18a is smaller than load $F_1$ of the Belleville spring 32, the adjusting bolt 18 is pulled by the adjusting nut 20. Also, since the conical surface 12a of the stepped piston 12 is in engagement with the conical surface 20a of the adjusting nut 20, no braking clearance adjusting action takes place.

However, if the fluid pressure applied into the cylinder 6 bears the relationship $P_1 \times A_1 > F_1$, the adjusting bolt 18 is returned to its original position to flex the Belleville spring 32 and disengage the adjusting nut 20 from the conical surface 12a of the stepped piston 12. Consequently, the adjusting nut 20 rotates and is displaced leftwardly relative to the adjusting bolt 18. At this time, the force of the Belleville spring 32 is not applied to the adjusting bolt 18 which is returned rightwards until it engages the rod 9. That is, the adjusting nut 20 is moved leftwardly by threaded engagement with the returning adjusting bolt 18, thus following the stepped piston 12.

When the fluid pressure within the cylinder 6 reaches a pressure $P_2$ at which the piston 17 causes the friction pad 47 to compress and the reaction portion 1 of the caliper 3 to deform, a gap is formed between the piston 12 and the piston 17. Consequently, the stepped piston 12 is moved rightwardly against the Belleville spring 14 by fluid pressure because of the difference between a sectional area $A_2$ of its large diameter portion provided with the seal ring 5 and a sectional area $A_3$ of its small diameter portion provided with the seal ring 40. This brings the two conical surfaces 12a and 20a into engagement with each other and unloads the threaded connection between the adjusting bolt 18 and the adjusting nut 20. Thereafter, the Belleville spring 32 is compressed even if the piston 17 advances and braking clearance adjusting action is discontinued. This condition is described by the following formula: $P_2(A_2-A_3) > F_2$; where $F_2$ represents the load of the Belleville spring 14.

When fluid pressure in the cylinder 6 is released, the piston 17 is returned by the strength of stability of the seal ring 16 with the conical surfaces 12a and 20a engaged. The amount of return of the piston 17 corresponds to the value of the aforementioned backlash illustrated in FIG. 4.

It should be understood that the disc brake of the present invention may also be used as a parking brake. That is, when the cam shaft 26 is rotated counterclockwise by actuation of a hand brake at a driver's seat, the adjusting bolt 18 is moved leftwardly by the rod 9. When the amount of the movement of the adjusting bolt 18 is larger than the backlash between the adjusting nut 20 and the adjusting bolt 18, the adjusting nut 20 is pushed leftwardly. This movement is transmitted by the conical surface 12a of the stepped piston 12 to the piston 17 thereby generating a braking force. However, no braking clearance adjusting action takes place.

The foregoing description presents the preferred embodiment of this invention. Modifications and alterations may occur to those skilled in the art which will come within the scope and spirit of the following claims.

What is claimed is:

1. A device for automatically adjusting a braking clearance for a disc brake in which a friction pad is placed in frictional engagement with a disc rotor by a hydraulically-operated main piston, said device comprising:

an adjusting bolt slidable relative to an end wall of a cylinder in which said main piston is fitted, said adjusting bolt having one end which extends into a liquid chamber of the cylinder;

stop means for controlling movement of said adjusting bolt in a direction apart from the disc rotor;

an adjusting nut threaded on said adjusting bolt with a predetermined thread clearance;

first spring means retained between said main piston and said adjusting nut for transmitting to said adjusting nut the movement of said main piston in a direction toward the disc rotor;

a stepped piston slidably mounted within an inner periphery of said main piston, said stepped piston being subjected to a force in a direction away from the disc rotor by fluid pressure in said liquid chamber;

limit means for preventing rotation of said stepped piston in said main piston;

a frictional surface defined by each of said stepped piston and said adjusting nut and adapted for engagement with each other; and second spring means disposed between said main piston and said stepped piston and adapted for biasing said stepped piston in a direction releasing engagement between said frictional surfaces, whereby in response to a given fluid pressure in said liquid chamber said stepped piston moves against said second spring means to engage said frictional surfaces and impede rotation of said adjusting nut.

2. A device as defined in claim 1 wherein both said frictional surfaces comprise mating conical surfaces.

3. A device as defined in claim 1 wherein said limit means comprises a pin which engages both said main piston and said stepped piston and which is disposed eccentrically with respect to a center axis of said stepped piston.

4. A device as defined in claim 1 including actuator means for driving said adjusting bolt towards the disc rotor and the friction pad is arranged to be urged against the disc rotor by the main piston through the adjusting nut and the stepped piston.

5. A device as defined in claim 1 wherein said frictional surfaces are brought into contact with each other by the biasing force of said first spring means.

6. A device as defined in claim 5 wherein said frictional surfaces are disengaged when the biasing force of said first spring means is less than the force exerted on said adjusting bolt by fluid pressure in said liquid chamber.

* * * * *